(12) United States Patent
Laurent et al.

(10) Patent No.: US 7,473,381 B2
(45) Date of Patent: Jan. 6, 2009

(54) METHOD FOR HYDROGEN PRODUCTION

(75) Inventors: Jean Yves Laurent, Domene (FR);
Frédéric Gaillard, Voiron (FR);
Nathalie Giacometti, Claix (FR); Bruno Valon, Grenoble (FR)

(73) Assignee: Commissariat A l'Energie Atomique, Paris (FR)

( * ) Notice: Subject to any disclaimer, the term of this patent is extended or adjusted under 35 U.S.C. 154(b) by 150 days.

(21) Appl. No.: 11/319,197

(22) Filed: Dec. 28, 2005

(65) Prior Publication Data

US 2006/0228293 A1    Oct. 12, 2006

Related U.S. Application Data

(63) Continuation-in-part of application No. 11/066,573, filed on Feb. 25, 2005.

(51) Int. Cl.
*C09K 3/00* (2006.01)
*B01J 7/00* (2006.01)
*C01B 3/06* (2006.01)

(52) U.S. Cl. .................. 252/182.32; 48/61; 423/279; 423/648.1; 423/658.2

(58) Field of Classification Search .................. 423/287, 423/648.1, 658.2, 279; 48/61
See application file for complete search history.

(56) References Cited

U.S. PATENT DOCUMENTS

| | | | | |
|---|---|---|---|---|
| 2,784,053 A | * | 3/1957 | Cunningham et al. | 423/286 |
| 3,063,791 A | * | 11/1962 | Kollonitsch et al. | 423/287 |
| 3,113,832 A | * | 12/1963 | Kollonitsch et al. | 423/287 |
| 3,348,928 A | * | 10/1967 | Kellom et al. | 423/287 |
| 3,364,203 A | * | 1/1968 | Cross et al. | 540/53 |
| 3,919,405 A | | 11/1975 | Lenz et al. | |
| 4,433,633 A | | 2/1984 | Candy et al. | |
| 2002/0166286 A1 | | 11/2002 | McClaine et al. | |

FOREIGN PATENT DOCUMENTS

| | | | |
|---|---|---|---|
| DE | 1567421 | * | 1/1970 |
| DE | 100 50 554 A 1 | | 10/2000 |
| EP | 310 408 A2 | | 9/1988 |
| WO | WO 2005/049485 | | 6/2005 |

OTHER PUBLICATIONS

R. Aiello et al., Production of Hydrogen Gas From Novel Chemical Hydrides, no date.

* cited by examiner

*Primary Examiner*—Wayne Langel
(74) *Attorney, Agent, or Firm*—McKenna Long & Aldridge LLP

(57) ABSTRACT

A method of producing hydrogen comprises reacting a hydrogenated compound and water. The hydrogenated compound is in contact with, or may be mixed with an oily substance.

8 Claims, 3 Drawing Sheets

METHOD FOR HYDROGEN PRODUCTION

This application is a continuation in part application of U.S. application Ser. No. 11/066,573 filed Feb. 25, 2005, which is incorporated by reference for all purposes as if fully set forth herein.

BACKGROUND OF THE INVENTION

1. Field of the Invention

The present invention relates to a method for producing hydrogen. The present invention may in particular be applied to the hydrogen feed supply of a fuel cell.

2. Discussion of the Related Art

As depicted in FIG. 1, a fuel cell 1 comprises a hydrogen feed supply 4 and an oxygen feed supply 6. The fuel cell 1 produces both $H_2O$, and electricity. Various mechanisms and methods for producing hydrogen have been developed in the related art.

However, new methods are always being sought to produce this non-toxic gas using catalysts in the fuel cell under conditions of increasing satisfactory yield and increasing safety.

In addition, it is difficult to control a hydrogen production reaction, without the inconvenience of by-products. Also, it is difficult to stop or to resume production of hydrogen on demand or as needed.

SUMMARY OF THE INVENTION

Accordingly, the present invention is directed to a method for hydrogen production that substantially obviates one or more of the problems due to limitations and disadvantages of the related art.

According to the present invention, hydrogen is produced from a reaction between a hydrogenated compound, such as a metallic hydride, and water. The hydrogenated compound is initially, and at least in part, put in contact with or mixed with an oily substance. The hydrogenated compound may be, for example, $CaH_2$, or $MgH_2$, or LiH, or $LiBH_4$ or $NaBH_4$, or $Mg(BH_4)_2$. The oily substance may be, for example, a vegetable oil, a silicone oil, or a mineral oil, such as Vaseline.

The presence of an oily substance has an anti-foaming effect during the reaction. The oily substance prevents the aggregation of any product of the reaction between the hydrogenated compound and water. For example, the oily substance may make a by-product porous. Such a product would otherwise have a tendency to accumulate in solid form in a compartment in which the reaction is occurring.

For example, the reaction of $NaBH_4$ with water produces $NaBO_2$, which solidifies, accumulates in the compartment in which the reaction takes place, and thereby stops the reaction for producing hydrogen. However, in the present invention, for such a fractionated hydrogen production, resumptions of the reaction are possible.

In the present invention, the hydrogenated compound may be initially produced in the form of a compacted material, such as a pellet. An oily substance may be put in contact with this compound, either when the compound is in a compacted form or when the compound is still in powder form. When the oily substance is put in contact with the compound in powder form, the oily substance may be mixed with the powder. This mixture may then be pressurized or compacted to form a compact body, such as a pellet. Pellets that incorporate an internal volume of oily substance may also be produced. Furthermore, according to a variant, a pellet surrounded by a layer of oily substance may also be produced.

According to another embodiment of the present invention, the oily substance may be put in contact with the hydrogenated compound right before the beginning of any hydrogen production.

According to still another embodiment of the present invention, a hydrogenated compound in a compact form, such as a pellet form, may be in contact with the oily substance prior to hydrogen production.

A hydrogen production reaction, starting with a hydrogenated compound and in the presence of an oily compound, is easily controllable, and may in particular be stopped or recommenced on demand, according to the need for hydrogen production.

The invention also relates to a solid reactive compound comprising a hydrogenated compound in contact, or mixed, with an oily substance.

The hydrogenated compound may be chosen from among $CaH_2$, $MgH_2$, LiH, $LiBH_4$, $NaBH_4$, or $Mg(BH_4)_2$. The oily substance may be, for example, a silicone oil, a mineral oil, a vegetable oil, or Vaseline. The hydrogenated compound according to the present invention may have a mass between 0.1 gram and 10 kg. The oily substance may have, for example, a volume between 0.01 ml and 10 ml.

The hydrogenated compound may be in the form of a solid block on which one or more drops of the oily substance are deposited. This hydrogenated compound may be obtained by mixing a powder of the hydrogenated compound with one or more drops of the oily substance. Then, a solid block may be formed of this mixture.

A compound according to the present invention may have the form of a pellet including a cavity, which may contain one or more drops of the oily substance.

According to another body of the present invention, a solid body of said hydrogenated compound may be surrounded by a layer of the oily substance.

The present invention also relates to a hydrogen production device comprising first means forming a reservoir containing a hydrogenated compound and an oily substance, second means forming a reservoir to contain an aqueous solution, and means conducting part of the aqueous solution of the first means toward the second means. The composition or shape of the hydrogenated compound or the composition of the oily substance may be of the type already disclosed above.

In such a device according to the present invention, the hydrogenated compound and the oily substance may be separated before any hydrogen production reaction. The device may then additionally comprise means bringing them in contact at the time of the beginning of the hydrogen production reaction. Means may bring the hydrogenated compound and the oily substance in contact by relative movement of the hydrogenated compound and the oily substance.

It is to be understood that both the foregoing general description and the following detailed description are exemplary and explanatory and are intended to provide further explanation of the invention as claimed. The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE ILLUSTRATED EMBODIMENTS

Figure 1:
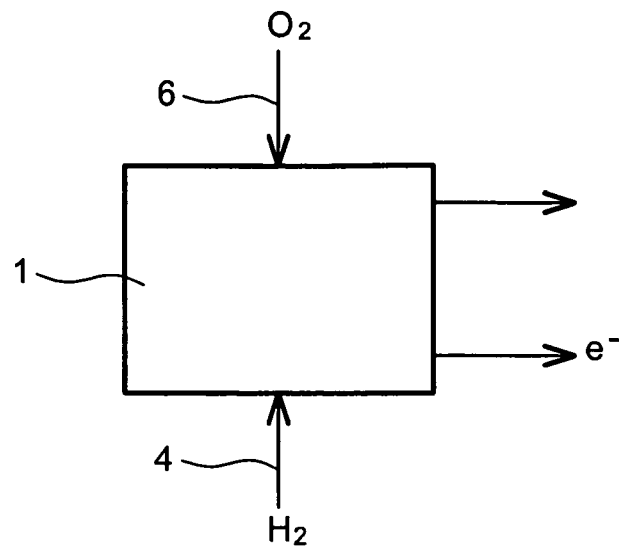
FIG. 1 is a schematic view of a fuel cell of the related art.
Figure 2:
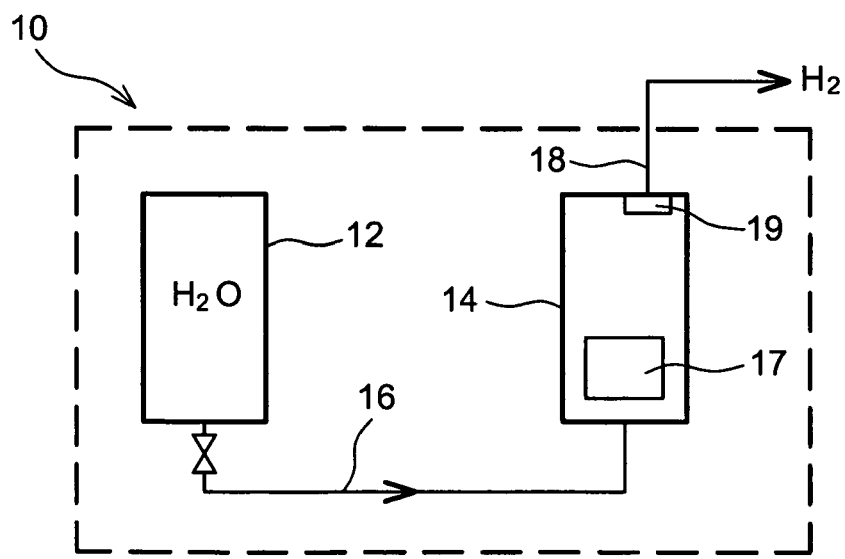
FIG. 2 is a schematic view of a device in which hydrogen production takes place according to the present invention.

FIG. 2 is a schematic view of a device, such as a reactor, in which hydrogen production takes place according to the present invention. The device 10 comprises two compartments or cartridges 12, 14.

The first cartridge 12 contains water and may contain a catalyst. The catalyst may be a cobalt salt such as cobalt chloride $CoCl_2$, or a ruthenium salt, such as $K_2RuCl_5$ or $RuCl_2$. An acid, such as acetic acid, may be included. The acid maintains the Ph of the liquid contained in compartment 12 at a value less than 7.

Figure 7:
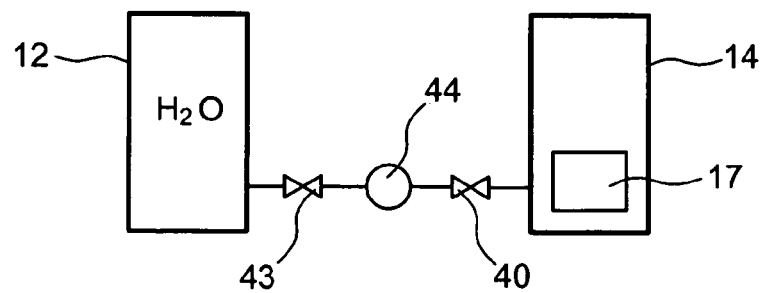
FIG. 7 is a schematic view of a system in which a mixture of two substances may be produced according to the present invention.

The second compartment 14 comprises a pellet 17 of a hydrogenated compound, for example $NaBH_4$. This compound, which may also be chosen from among $CaH_2$, $MgH_2$, LiH, $LiBH_4$, $Mg(BH_4)_2$, is mixed, or in contact, with an oily substance, such as for example a silicone oil, or a mineral oil, such as Vaseline, or a vegetable oil. The hydrogenated compound and the oily substance may be initially separated in distinct sub-compartments, and then mixed only at the time of the beginning of hydrogen production reaction, for example, by means of a system such as depicted in FIG. 7.

An antifreeze may be added to the water before the reaction, for example an alcohol or a polyalcohol, such as ethanol, methanol or 1,2-ethanediol, in the proportion of, for example, 15%. Shaping of the solid compound 17 may be performed by compression at 0.8 tons per $cm_2$ to form, for example, pellets.

According to a quantitative example, $NaBH_4$ pellet 17 has a mass of 0.4 grams, and is put in contact with or mixed with approximately 0.02 ml of an oily substance such as a saturated hydrocarbon Vaseline. For 0.4 grams of solid substance, a volume of oily substance between 0.01 ml and 0.2 ml or 0.5 ml or 10 ml may also be used. For larger masses of solid substance 17, larger volumes of oily substance will also be used.

The mass of solid substance 17 may be different, for example between 0.1 gram and 10 kg. The volume of fatty substance used may be in the proportion of 0.02 ml of oily substance for 0.4 g of solid substance or 1 ml of oily substance for 20 g of solid substance.

The hydrogen is produced by reacting the water of compartment 12, conveyed by the fluidic communication means 16, and the hydrogenated compound 17. For example, the water may be pressured by a piston-spring system.

For example, in the case of $NaBH_4$, the hydrogen production reaction is written:

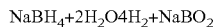

$$NaBH_4 + 2H_2O \rightarrow 4H_2 + NaBO_2$$

The presence of the oily substance prevents solidification of the $NaBO_2$, which, otherwise, would accumulate in compartment 14 and would thereby prevent the production of hydrogen.

Hydrogen gas may escape from compartment 14 by conduit 18, after having crossed filter 19, arranged in cartridge 14. Hydrogen gas may also escape from an area of the cartridge not situated at a top of the cartridge.

With the proportions indicated above, 0.4 g of $NaBH_4$ and 0.01 ml of Vaseline, hydrogen is produced at a flow rate of approximately 10 $cm^3$ per minute. The oily substance attains a permanent mixing of by-products, such as $NaBO_2$, and therefore contributes to the regulation of the flow rate of hydrogen produced. It is therefore possible to stop or resume hydrogen production on demand, according to the needs of any apparatus arranged downstream of the hydrogen production means 10.

Figure 3:
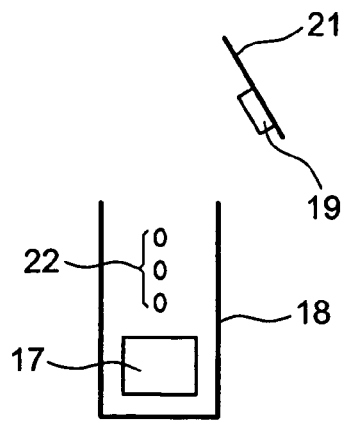
FIG. 3 to 6 show various modes for preparation of a hydrogenated compound type reagent according to the present invention.

According to an embodiment depicted in FIG. 3, a pellet 17 of a hydrogenated compound, produced in solid form, is placed at the bottom of compartment 18. A few drops 22 of the oily substance deposited on this solid form, which may be a pellet. It is then possible to seal compartment 18 by means of a cover 21 possibly equipped with a filter 19.

Figure 4A:
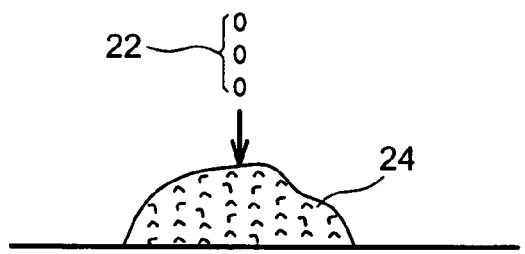
Figure 4B:
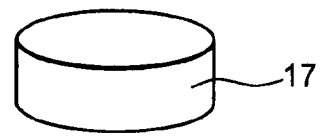

As shown in FIG. 4A, and according to another embodiment of the present invention, the hydrogenated compound is preliminarily in pulverulent or powder form 24. The drops 22 of an oily substance are deposited on the powder 24. A mixture may thus be produced. As shown in FIG. 4B, this mixture may then be compacted to form a pellet 17 capable of being incorporated in a reaction compartment 14.

Figure 5A:
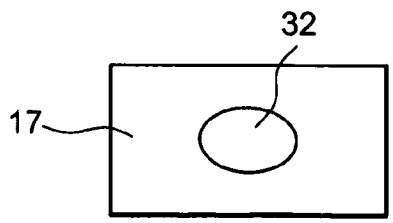
Figure 5B:
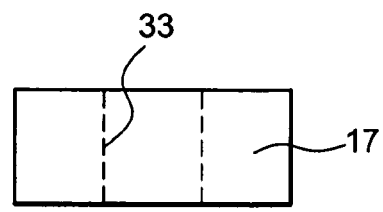

According to still another embodiment of the present invention, depicted in FIG. 5A, a pellet 17 is produced with a central compartment 32 containing the oily substance. According to another embodiment of the present invention, as shown in FIG. 5B, a central compartment 33 crosses the pellet 17 and may be filled with the oily substance after introduction of the pellet into compartment 14.

Figure 5C:
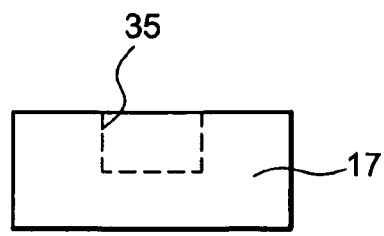

According to another embodiment of the present invention, it is also possible to have a central compartment 35 blind, as shown in FIG. 5C, on one side of the pellet 17 and open on another side. This compartment may be filled with the oily substance before or after introduction of the pellet into compartment 14.

Figure 6:
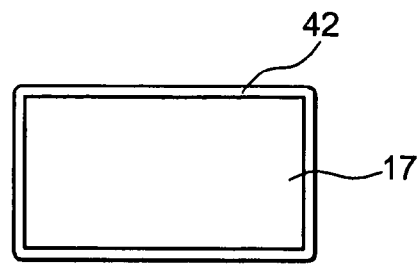

According to another embodiment of the present invention, as shown in FIG. 6, a pellet 17 is surrounded by a film 42 of the oily substance.

In these various embodiments, the pellet 17 is capable of being introduced into the reaction compartment 14.

The term pellet must not be understood in a restrictive way. The hydrogenated compound may be present in any solid form in any shape whatever, compatible with a receptacle such as receptacle 18.

As shown in FIG. 7, device 10 can include communicating means 40, 43 and 44.

The invention applies to any fuel cell, but also to other types of applications which require pure hydrogen. A fuel cell according to the present invention comprises means to react hydrogen and oxygen in order to produce water and electricity. A fuel cell also includes a device for hydrogen production according to the present invention.

It will be apparent to those skilled in the art that various modifications and variations can be made in the present invention without departing from the sprit or scope of the invention. Thus, it is intended that the present invention covers the modifications and variations of this invention provided they come within the scope of the appended claims and their equivalence.

What is claimed is:

1. A solid reactive compound comprising a hydrogenated compound in contact with an oily substance, wherein the oily substance has a volume between 0.01 mL and 10 mL.

2. The compound of claim 1, wherein the hydrogenated compound is selected from the group consisting of $CaH_2$, $MgH_2$, $LiH$, $LiBH_4$, $NaBH_4$, and $Mg(BH_4)_2$.

3. The compound of claim 1, wherein the oily substance is selected from the group consisting of a silicone oil, a petroleum oil, a Vaseline oil, a mineral oil, a vegetable oil, and Vaseline.

4. The compound of claim 1, wherein the hydrogenated compound has a mass between 0.1 gram and 10 kg.

5. The compound of claim 1, wherein the hydrogenated compound is in a form of a solid block on which one or more drops of the oily substance are deposited.

6. The compound of claim 1, wherein the hydrogenated compound is obtained by mixing a powder of hydrogenated compound with one or more drops of the oily substance, and then forming a solid block.

7. The compound of claim 1, wherein the hydrogenated compound has a form of a pellet incorporating a cavity to contain one or more drops of the oily substance.

8. The compound of claim 1, wherein the hydrogenated compound is in solid form and is surrounded by a layer of the oily substance.

* * * * *